United States Patent
Kawamura et al.

(10) Patent No.: US 6,424,614 B1
(45) Date of Patent: Jul. 23, 2002

(54) DATA RECORDING MEDIUM AND RECORD/PLAYBACK APPARATUS USING THE DATA RECORDING MEDIUM

(75) Inventors: Makoto Kawamura; Yoshiyuki Akiyama; Yasushi Fujinami; Jun Yonemitsu; Tomihiro Nakagawa, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/909,349

(22) Filed: Aug. 11, 1997

Related U.S. Application Data

(63) Continuation of application No. 08/562,428, filed on Nov. 24, 1995, now abandoned.

(30) Foreign Application Priority Data

Nov. 30, 1994 (JP) .............................. 6-321602

(51) Int. Cl.[7] .................................. G11B 7/00
(52) U.S. Cl. ..................... 369/275.3; 369/94
(58) Field of Search ................ 369/275.1–275.4, 369/32, 93, 97, 98

(56) References Cited

U.S. PATENT DOCUMENTS

| | | | | |
|---|---|---|---|---|
| 5,245,600 A | * | 9/1993 | Yamauchi et al. | 369/49 |
| 5,373,499 A | * | 12/1994 | Imaino et al. | 369/275.4 |
| 5,418,774 A | * | 5/1995 | O'Hara et al. | 369/275.3 |
| 5,428,597 A | * | 6/1995 | Satoh et al. | 369/275.3 |
| 5,499,231 A | * | 3/1996 | Fennema et al. | 369/724 |
| 5,513,170 A | * | 4/1996 | Best et al. | 369/275.1 |
| 5,606,543 A | * | 2/1997 | Sugiyama | 369/275.3 |
| 5,608,701 A | * | 3/1997 | Jamail | 369/275.3 |

FOREIGN PATENT DOCUMENTS

| | | |
|---|---|---|
| EP | A-0 426 409 | 5/1991 |
| EP | A-0 517 490 | 12/1992 |
| GB | A-2 -17 379 | 10/1979 |

OTHER PUBLICATIONS

Patent Abstracts of Japan, vol. 018, No. 624, (P–1833), Nov. 28, 1994, & JP–A–06 236555 (Victor Co of Japan LTD), Aug. 23, 1994.

* cited by examiner

*Primary Examiner*—Nabil Hindi
(74) *Attorney, Agent, or Firm*—Frommer Lawrence & Haug LLP; William S. Frommer

(57) ABSTRACT

High-speed access to a multi-layered disk is to be realized. Each layer on a multi-layered disk includes an inside guard area 2, program area 3, and outer guard area 5 which are located in uniform radial positions in all layers. The uppermost layer has the recording direction from the inner side to the outer side of the disk, and the next layer has the recording direction from the outer side to the inner side of the disk such that opposite recording directions appear alternately. The radial position of the recording terminal end on the uppermost first layer coincides with the radial position of the start of record on the next second layer.

12 Claims, 11 Drawing Sheets

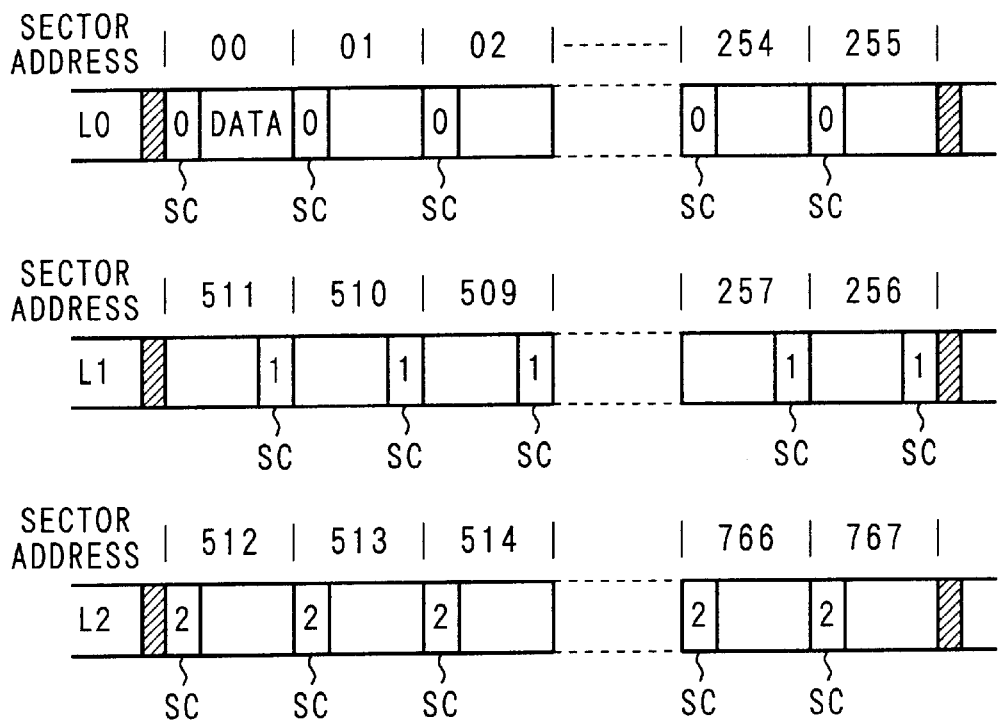
Fig. 5A
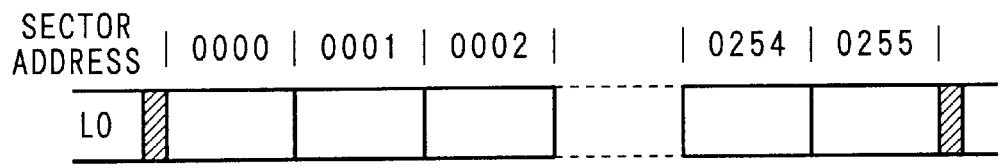
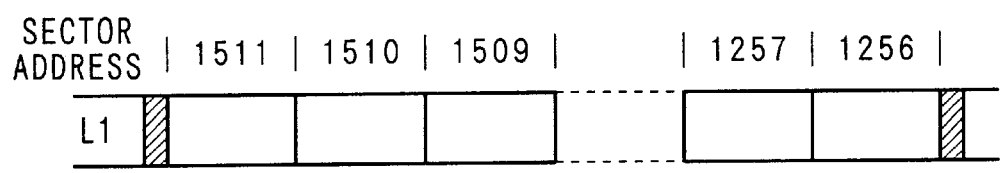
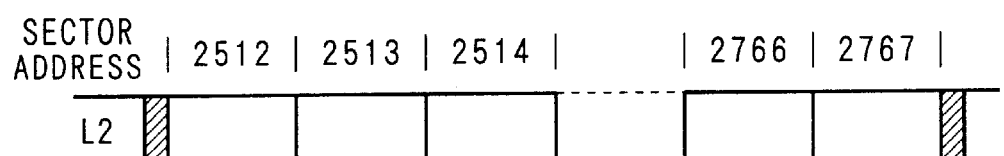
Fig. 5B

Fig. 6

LAYER FIELD msb                             lsb

| b7 | b6 | b5 | b4 | b3 | b2 | b1 | b0 |
|----|----|----|----|----|----|----|----|
| RESERVED | | TOTAL LAYERS | | | LAYER NUMBER | | |

Fig. 7

TOTAL LAYERS

| TOTAL LAYERS VALUE | MEANING |
|---|---|
| 1 | 1 LAYER DISC |
| 2 | 2 LAYER DISC |
| 0, 3, · · · , 7 | RESERVED |

Fig. 8

LAYER NUMBER

| LAYER NUMBER VALUE | MEANING |
|---|---|
| 0 | LAYER 0 |
| 1 | LAYER 1 |
| 2, · · · , 7 | RESERVED |

Fig. 11

FIRST TOC SECTOR LAYOUT

| BYTE POSITION | SIZE (BYTES) | FIELD NAME | CONTENT |
|---|---|---|---|
| 0 | 4 | SYSTEM IDENTIFICATION | "HDCD" |
| 4 | 4 | SYSTEM VERSION NUMBER | "0100" |
| 8 | 2 | NUMBER OF TOC SECTORS | |
| 10 | 2 | TOC SECTOR NUMBER | |
| 12 | 4 | RESERVED | $00 |
| 16 | 48 | DISC ENTRY | |
| 64 | 16 | LAYER 0 ENTRY | |
| 80 | 16 | LAYER 1 ENTRY | |
| 96 | 64 | PUBLISHER ENTRY | |
| 160 | 32 | MANUFACTURER ENTRY | |
| 192 | 255 | RESERVED | $00 |
| 448 | 16 | TRACK ENTRY 0 | |
| ⋮ | | ⋮ | |
| 488+N*16 | 16 | TRACK ENTRY N | |
| ⋮ | | ⋮ | |
| 2032 | 16 | TRACK ENTRY 99 | |

Fig. 12

DISC ENTRY LAYOUT

| BYTE POSITION | SIZE (BYTES) | FIELD NAME | CONTENT |
|---|---|---|---|
| 16 | 1 | DISC SIZE | |
| 17 | 1 | RESERVED | $00 |
| 18 | 1 | NUMBER OF LAYERS | |
| 19 | 2 | NUMBER OF TRACKS | |
| 21 | 2 | LOGIC TRACK NUMBER OFFSET | |
| 23 | 1 | DISC APPLICATION ID | |
| 24 | 16 | VOLUME ID | |
| 40 | 2 | VOLUME SET SIZE | |
| 42 | 2 | VOLUME SEQUENCE NUMBER | |
| 44 | 1 | RESERVED | $00 |
| 45 | 3 | DISC INFO SECTOR | |
| 48 | 2 | DISC INFO OFFSET | |
| 50 | 14 | RESERVED | $00 |

Fig. 13

LAYER ENTRY LAYOUT

| BYTE POSITION | SIZE (BYTES) | FIELD NAME | CONTENT |
|---|---|---|---|
| 64+M*16 | 1 | LAYER NUMBER | |
| 65+M*16 | 1 | RESERVED | $00 |
| 66+M*16 | 3 | FIRST ADDRESS | |
| 69+M*16 | 1 | RESERVED | $00 |
| 70+M*16 | 3 | LAST ADDRESS | |
| 73+M*16 | 2 | FIRST TRACK NUMBER OFFSETT | |
| 75+M*16 | 2 | NUMBER OF TRACKS | |
| 77+M*16 | 1 | LAYER TYPE | |
| 78+M*16 | 1 | LAYER CLASS | |
| 79+M*16 | 1 | RESERVED | $00 |

Fig. 14

TRACK ENTRY N LAYOUT

| BYTE POSITION | SIZE (BYTES) | FIELD NAME | CONTENT |
|---|---|---|---|
| M+0 | 1 | RESERVED | $00 |
| M+1 | 3 | TRACK START ADDRESS | |
| M+4 | 1 | RESERVED | $00 |
| M+5 | 3 | TRACK END ADDRESS | |
| M+8 | 1 | COPYRIGHT | |
| M+9 | 1 | TRACK APPLICATION CODE | |
| M+10 | 1 | RESERVED | $00 |
| M+11 | 3 | TRACK INFO SECTOR | |
| M+14 | 2 | TRACK INFO OFFSET | |

Fig. 15

ADDITIONAL TOC SECTOR LAYOUT

| BYTE POSITION | SIZE (BYTES) | FIELD NAME | CONTENT |
|---|---|---|---|
| 0 | 4 | SYSTEM ID | |
| 4 | 4 | SYSTEM VERSION NUMBER | |
| 8 | 2 | NUMBER OF TOC SECTORS | |
| 10 | 2 | TOC SECTOR NUMBER | |
| 12 | 4 | RESERVED | $00 |
| 16 | 16 | TRACK ENTRY M | |
| • | • | • | |
| • | • | • | |
| 16+(N-M)*16 | 16 | TRACK ENTRY N | |
| • | • | • | |
| • | • | • | |
| 2032 | 2 | TRACK ENTRY M+126 | |

DATA RECORDING MEDIUM AND RECORD/PLAYBACK APPARATUS USING THE DATA RECORDING MEDIUM

This application is a continuation of application Ser. No. 08/562,428, filed Nov. 24, 1995 now abandoned.

BACKGROUND OF THE INVENTION

1. Field of the Invention

This invention relates to a data recording medium suitable for recording digital signals, for example, and a record/playback apparatus used for the data recording medium.

2. Description of the Related Art

Already known are multi-layered disks having a plurality of recording layers formed on a disk such that each layer is selectively read out under focus control of an optical pickup. For example, U.S. Pat. No. 5,263,011 discloses one of such multi-layered disks and a record and playback apparatus using the disk.

The technique on multi-layered disks by the above-identified document does not pay sufficient consideration for practical use, and it is still in the course of development. That is, no teaching is found about actual data writing and reading. In particular, no consideration is paid on recording and reproducing video data and/or audio data using compressed codes.

In a conventional CD (compact disk), for example, its recording track is formed to start from the inner side to the outer side of the disk. However, there has been no disclosure on how to form recording tracks on a multi-layered disk. Therefore, conventional techniques having been employed for single-layered disks involve many problems to be discussed henceforth, although they are employable in some limited cases.

OBJECTS AND SUMMARY OF THE INVENTION

In view of the situation, an object of the invention is to provide a data recording medium and a record/playback apparatus using the data recording medium.

According to the invention, there is provided a disk-shaped data recording medium, comprising:

at least a first and a second recording layers;

a first recording direction from the inner side to the outer side of the medium and a second recording direction from the outer side to the inner side of the medium being determined as directions for recording data;

one of the first and second recording directions being used as the recording direction of the first recording layer;

the other of the first and second recording directions being used as the recording direction of the second recording layer; and each of the recording layers including a data area in which data has a sector structure, and each sector containing at least a layer number for identifying the first recording layer and the second recording layer.

On the data area of each layer, data has a sector structure, and each sector contains the number of total recording layers on the disk.

Recording areas are provided such that an inner guard area of a respective layer overlaps with an outer guard area of another layer, and TOC areas contain at least data for access to all layers and data for identifying respective layers. The TOC area on the uppermost layer is provided in a location contiguous to the data area on the uppermost layer.

The data area of each layer has a sector structure, and sector numbers of respective sectors are determined according to a numbering system enabling identification of at least the layer numbers.

A record/playback apparatus using the data recording medium according to the invention accesses the medium by utilizing the recording layers, TOC areas, sector structure, etc. of the medium.

The data recording medium according to the invention can be readily accessed because of the structure of the recording tracks. Therefore, the record/playback apparatus using the data recording medium according to the invention can easily access the medium at a high speed.

The above, and other, objects, features and advantage of the present invention will become readily apparent from the following detailed description thereof which is to be read in connection with the accompanying drawings.

BRIEF DESCRIPTION OF THE DRAWINGS

FIGS. 5A and 5B are schematic views showing one and another examples of Sector Addresses;

FIG. 6 is a schematic view showing an example of the layer field;

FIG. 7 is a schematic view showing an example of data that represents the Number of Layers in the layer field;

FIG. 8 is a schematic view showing an example of data that represents the Layer Number in the layer field;

FIG. 11 is a schematic view for explaining data layout of the first TOC;

FIG. 12 is a schematic view for explaining layout of Disc Entry layout in the first TOC;

FIG. 13 is a schematic view for explaining layout of Layer Entry in the first TOC;

FIG. 14 is a schematic view for explaining layout of Track Entry in the first TOC;

FIG. 15 is a schematic view for explaining data layout of additional TOC; and

DETAILED DESCRIPTION OF THE PREFERRED EMBODIMENTS

Figure 1:
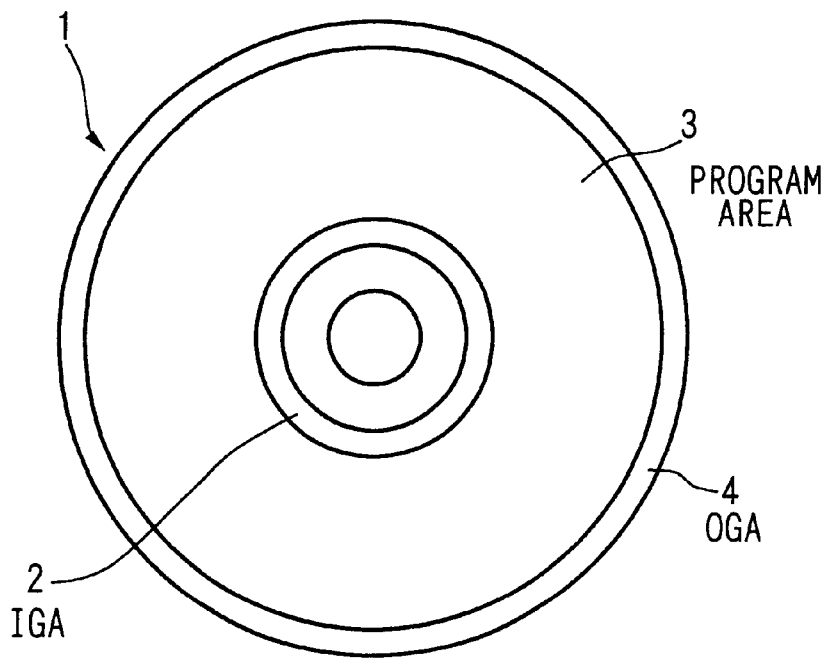
FIG. 1 is a schematic view showing an aspect of divisional areas on a disk according to an embodiment of the invention.

An embodiment of the invention is described below. The invention is a multi-layered disk in which a plurality of recording layers are provided in the thickness direction of the disk 1. One of the recording layers nearest to the surface for confrontation with a pickup is referred to as the uppermost recording layer in the following description. FIG. 1 is a schematic view taken from above the disk 1 for explaining areas of the multi-layered disk according to the invention.

Numeral 2 denotes an inner guard area (called IGA), 3 a program area, and 4 an outer guard area (called OGA). In case of the uppermost recording layer L0, the IGA is a read-in area, and the OGA is a read-out area. In the next layer L1, the OGA is a read-in area, and the IGA is a read-out area.

Explained below are structures of the respective layers with reference to FIGS. 2A and 2B. The invention involves both making a spiral recording track departing from the inner side to the outer side of a disk and making a spiral recording track departing from the outer side to the inner side of a disk. As to the relationship between the plurality of layers, layers to be recorded from the inner side to the outer side of the disk and layers to be recorded from the outer side to the inner side of the disk lie alternately. Further, as an example, layers with even numbers, L0, L2, . . . are to be recorded from the inner side to the outer side of the disk while layers with odd numbers. L1, L3, . . . are to be recorded from the outer side to the inner side of the disk. The even numbers and odd numbers used here are reference numbers assigned to layers L only for the purpose of explanation, and the uppermost layer is assigned with an even number, L0, although it is in the first order.

Figures 2A, 2B:
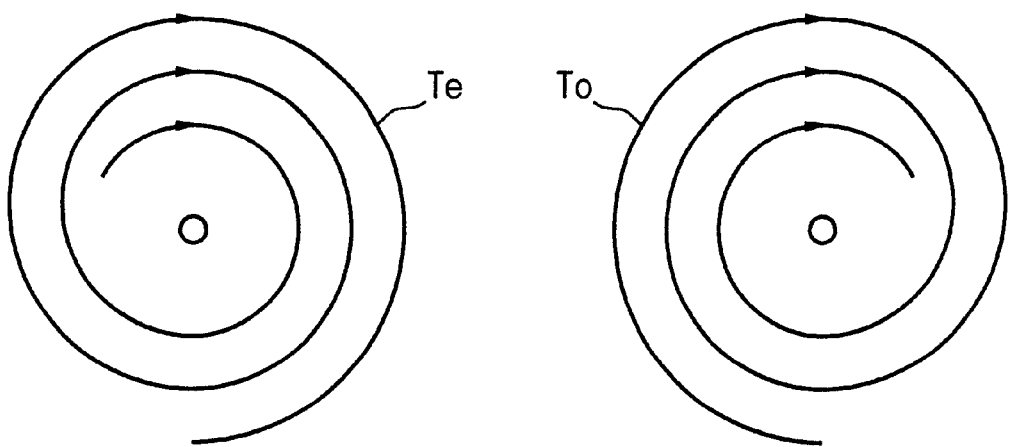
FIGS. 2A and 2B are schematic views for explaining recording directions in an embodiment of the invention.

That is, FIG. 2A shows a spiral recording track Te of each layer having an even number, which is recorded from the inner side to the outer side of the disk as shown by the arrow mark. On the other hand, as shown in FIG. 2B, the recording track To of each layer having an odd number is spirally recorded from the outer side to the inner side of the disk. In this case, the uppermost layer is referred to as the 0-numbered layer, L0, on which recording proceeds from the inner side to the outer side of the disk.

In terms of the spiral directions, recording tracks are classified into those having forward spiral recording tracks Te and those having reverse spiral recording tracks To, depending of respective layers. The layers with forward spiral recording tracks Te and the layers with reverse spiral recording tracks To are disposed to appear alternately such that data is recorded on forward spiral recording tracks in even-numbered layers L0, L2, . . . and on reverse spiral recording tracks in odd-numbered layers L1, L3, . . . The uppermost layer L0 definitely has the forward spiral recording track Te (the same direction as that of typical CDs) in order that an erroneously loaded disk can be distinguished, even when the disk size is the same as that of typical CDs.

Returning back to FIG. 1, program areas on the disk are formed to terminate at equivalent positions. That is, the final end of signals on each even-numbered layer and the initial end of signals on each odd-numbered layer lie on approximately the same radial positions on the disk. For example, the final end of signals on each even-numbered layer and the initial end of signals on each odd-numbered layer are positioned very close. Approximate coincidence of their radial positions is sufficient, and their angular positions need not be close. More specifically, the total amount of data to be recorded on a disk is calculated, and the pickup is turned back and moved from a layer to a lower layer upon recording a half amount of data, such that the final end of the data comes to the same radial position as that of the inner side of the upper layer. In this manner, repeated reproduction is facilitated, and the access speed for moving to a lower layer is increased. Therefore, as shown in FIG. 1 taken from above the disk, program areas of respective layers coincide.

Next explained are the IGA and the OGA. As shown in FIG. 1, the inner side IGA is uniformed among respective layers. The OGA of a respective layer is also uniformed with that of one of the layers having the largest recording area (program area) in the recording medium, such that the IGA and the OGA can be identified in any layer when the reading layer is changed by focus jump from one layer to another near the inner side or the outer side of the disk.

In CDs, the innermost data record prohibiting area and the end of data are detected through detection of read-in/read-out areas. However, this is effective because CDs are single-layered. In case of the disk according to the invention having a plurality of layers, even when data ends at a radial position of a certain layer, another layer may have data recorded beyond the same radial position.

In this embodiment, even when data on a certain layer ends at a certain radial position, if another layer has data recorded beyond the same radial position, then empty data (for example, data comprising a string of zero) is recorded on the former layer up to the same radial position. Tracks having recorded empty data are called empty tracks. If empty data is not recorded, then it may occur that sector head information cannot be found when the reading layer is changed by focus jump from a layer with data to another without data. When sector head information is not obtained, control onto the pickup and servo control will be difficult.

Figure 3:
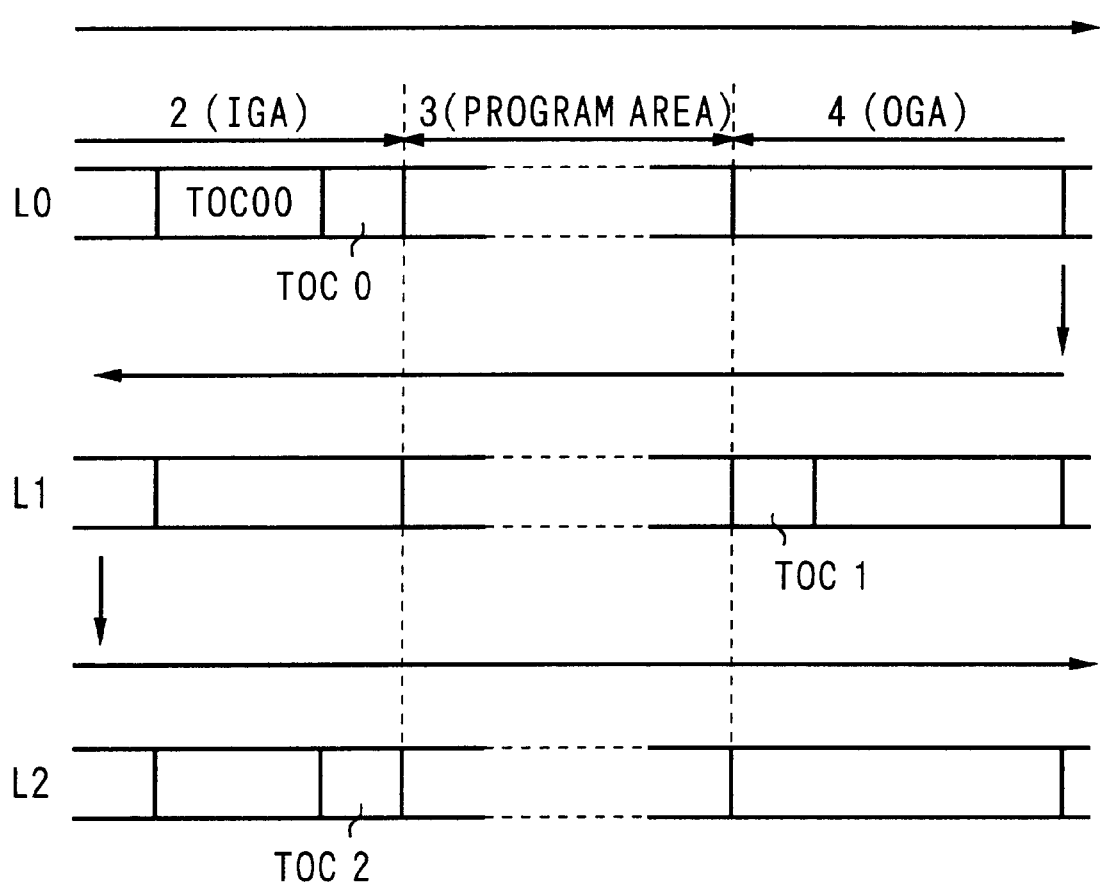
FIG. 3 is a schematic view illustrating an example of locations of TOC on a disk according to the invention.

Next explained is the TOC (Table of Contents) with reference to FIG. 3. FIG. 3 shows layout of recording tracks, showing respective layers in a cross-sectional view of the disk. Numeral 2 denotes the IGA, 3 denotes program areas, and 4 labels the OGA. Arrows show moving directions of the pickup.

Among even-numbered layers and odd-numbered layers, positions for recording the IGA and the OGA are uniformed. That is, the TOC of layer L0 (TOC0) and the TOC of layer L2 (TOC2) are located in the same area. Thus the time required for the IGA can be reduced.

The TOC of all layers (TOC00) is recorded on the uppermost layer. Thus the states of all layers of the disk can be identified with reference to the IGA of the first layer L0 alone. If the first layer L0 contains the TOC of another layer, TOC00 for example, then the TOC0 on its own layer is recorded in a location nearest to the program area to facilitate identification from the other layer. Thus the time from the IGA to the start of the program can be shortened.

The TOC00 contains important data defining the disk. For example, if both conventional single-layered disks and multi-layered disks are acceptable as standard disks, then the TOC00 contains ID for distinguishing whether a disk is single-layered or multi-layered. In another example, the TOC00 contains information indicating the total layers of a multi-layered disk. Further, by linking with the TOC0 to the TOCn of respective layers, the TOC00 can be first accessed upon an access request to determine the TOC of which layer is to be next accessed. Moreover, the TOC00 may contain the largest radius of program areas of all layers to prevent the pickup from reading areas beyond the largest radius. Therefore, when different disks with different sizes are standardized, overrun (dropout of the pickup from the program area) on a small-sized disk can be prevented.

Figure 4:
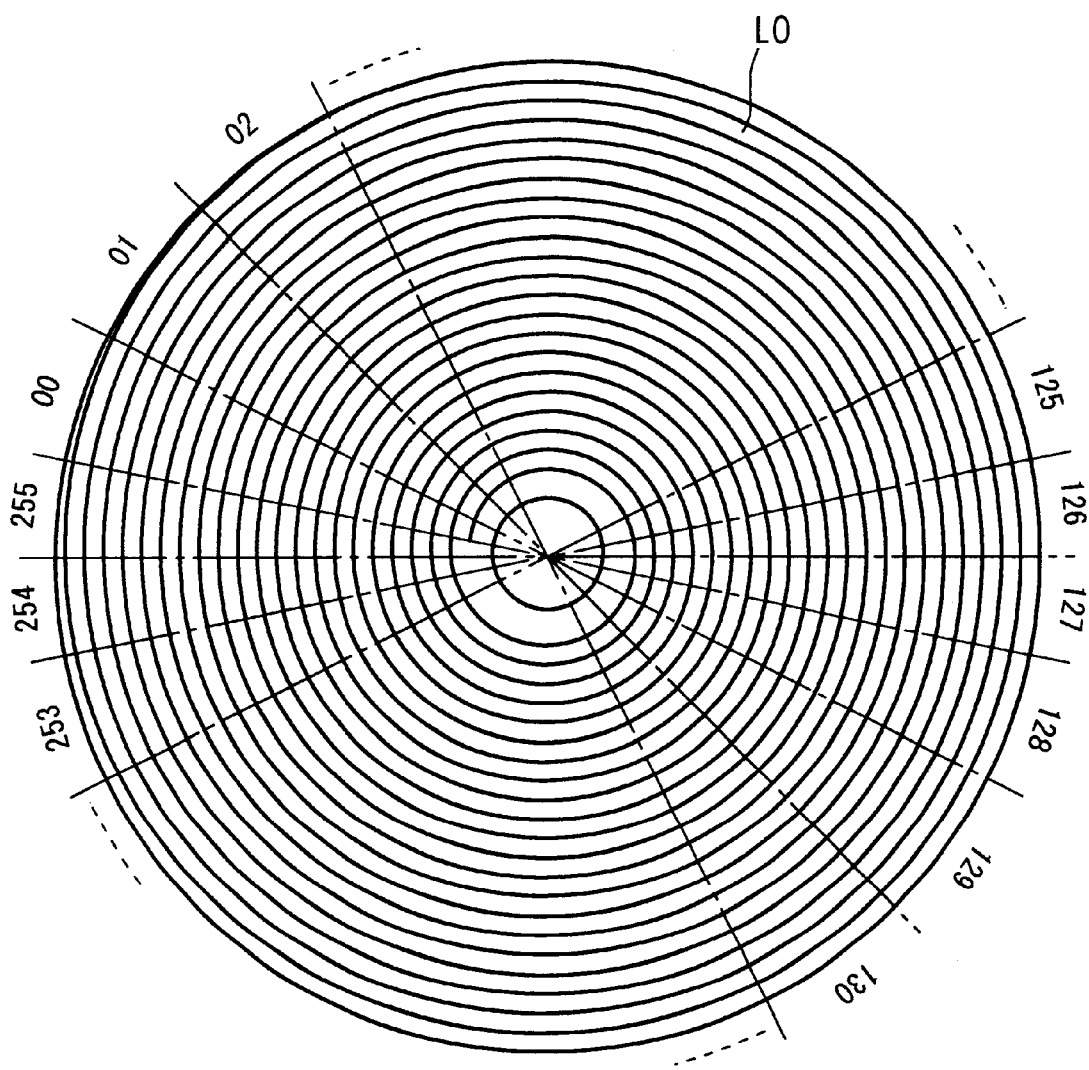
FIG. 4 is a schematic view of an example of dividing sectors on a disk according to the invention.

Data recorded on the disk has a sector structure. Sectors are explained below with reference to FIGS. 4, 5A and 5B. FIG. 4 schematically shows the sector structure of the first layer L0. In the example of FIG. 4, a disk of a constant angular velocity (CAV) type is taken for simplicity. Actually, however, a disk of a constant linear velocity (CLV) type is used considering the recording density.

Data on each layer is recorded in the unit of sectors (00 to 255). Considering that the data of all layers constitutes a single program, it is easy to assign consecutive numbers to sector addresses of a plurality of layers. For example, in the second layer not shown, sector addresses (256 to 511) are used, and in the third layer, sector addresses (512 to 767) are used. Moreover, description of layer numbers is necessary to facilitate selection of a respective layer.

In this connection, as shown in FIG. 5A, the layer number of each sector is recorded on the sub-code SC. In addition to the layer number, the cutting direction, such as from the inner side to the outer side of the disk (or the vice versa), reverse spiral, or the like, is preferably recorded on the sub-code SC.

In lieu of describing the layer number as the sub-code, combined codes with the layer number and sector addresses may be recorded as sector addresses of the multi-layered disk. That is, the layer number is added as a primary bit of sector addresses. In this case, the layer number of the uppermost layer must be 0. Therefore, sector addresses of the uppermost layer are (0000 to 0255). In regard of the other layers, the sequence of the layer numbers coincides with the physical sequence of the layers. It should be prevented to skip layer numbers or to substitute the order so as to facilitate the changeover from a layer to another.

It is also possible that layer information recorded on the sub-code Sc contains the number of total recording layers on the disk in addition to the layer number. FIG. 6 shows such an example. In FIG. 6, a one-byte layer field contains the field of the 3-bit number (b5 to b3) of total layers and the field of the 3-bit (b2 to b0) layer number.

FIG. 8 shows definition of layer numbers. Although only layer numbers L0 and L1 are defined here, the usage of the field is the same as shown in FIGS. 5A and 5B.

FIG. 7 shows definition of numbers of total layers. Here are defined 1 and 2 as numbers of total recording layers. For example, if both conventional single-layered disks and multi-layered disks are acceptable as standard disks, this field is used for determining whether a disk is single-layered or multi-layered.

Further explained is another example of sector header information such as sector address. Header information contains a track number, sector address, copyright code, application code, and so forth, in addition to the layer number. Each track number is a 16-bit code, and values (0 to 65533) are assigned as track numbers in the program area of the disk, in which 65534 is the track number of the OGA and 65535 is the track number of the IGA.

Each sector address has the length of 24 bits. In the following description, $ represents 16 digits. Each sector address is a 24-bit two-complement code. In forward spiral layers L0, L2, . . . , the sector address increases from the inner side to the outer side of the disk. In reverse spiral layers L1, L3, . . . , the sector address increases from the outer side to the inner side of the disk. If recording is started from the innermost $000000 in forward spiral layers, then recording on reverse spiral layers is done such that the innermost sector address becomes $800000, for example. On each radial position of the disk, the relation between the sector address SAd0 of layer L0 and the sector address SAd1 of layer L1 is:

$$SAd1 = SAd0 \; XOR \; \$7FFFFF$$

In this manner, sector addresses at the same radial position in both forward spiral layers and reverse spiral layers can be converted by a simple calculation because the exclusive logical sum (XOR) with $7FFFFF may be calculated.

In case of CLV disks, in particular, the number of sectors in one track varies with the radius. Therefore, it is effective for the servo circuit to use a current position (radial information) of the pickup to know the number of tracks to be jumped over upon accessing a particular sector. Radial information can be obtained also from the sector address by reference to the table, for example. In this case, if sector addresses are determined with no consideration about the forward spiral direction and the reverse spiral direction, then different tables must be prepared for the forward spiral direction and for the reverse spiral direction. If the outermost sector address is not standardized, then radial information is not calculated from the reference table, and calculation or measurement of the number of total sectors in one track will be required.

Since this example is configured to assign sector numbers that makes it easy to convert sector addresses either in forward spiral layers or in reverse spiral layers by simple calculation, each sector address on either layer can be easily converted into radial information. Thus the amount of tables required can be reduced, and high-speed access is realized.

Figure 9:
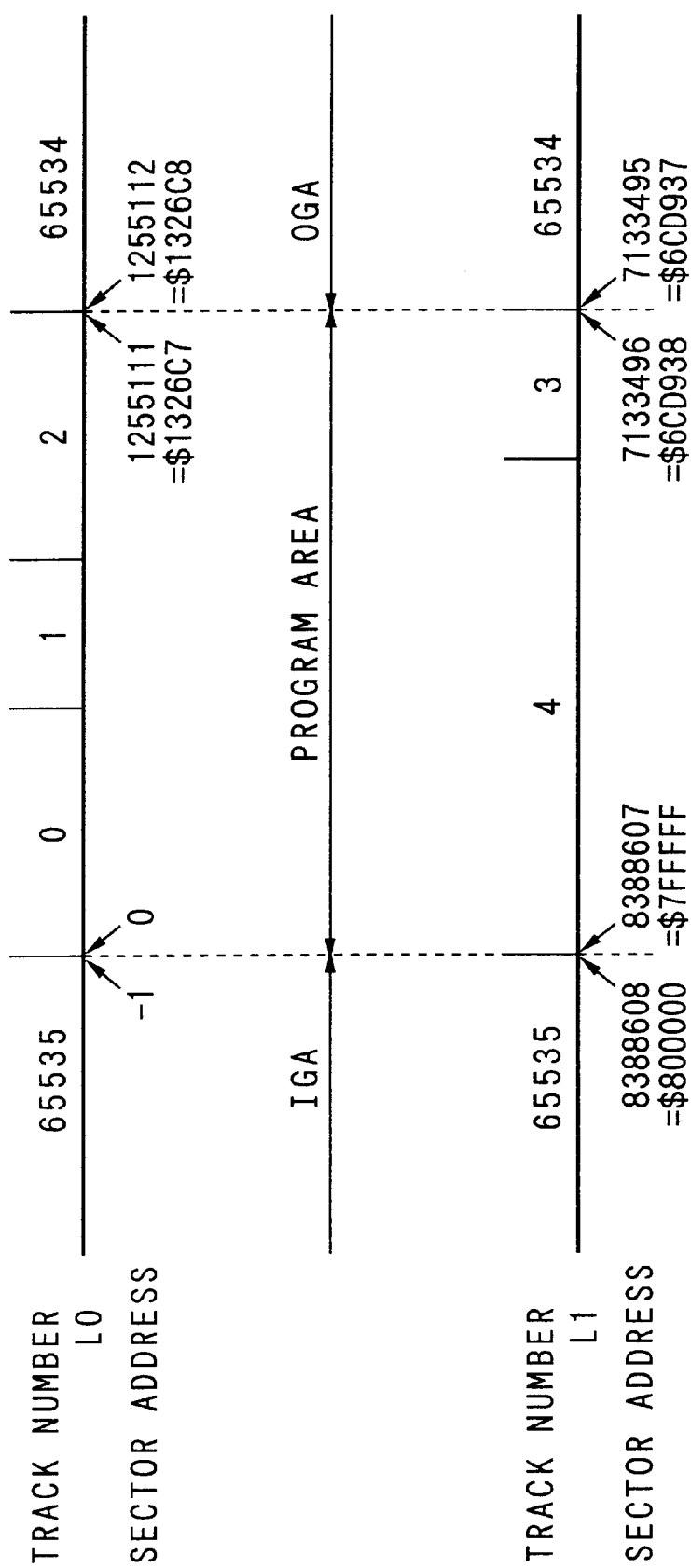
FIG. 9 is a schematic view for explaining a still further example of Sector Addresses.

FIG. 9 shows a disk layout with addresses determined in the above-explained manner. The sector address of the last sector in the IGA (inner guard area) of layer L0 is equal to (−1). The track number for all sectors in the IG3 is equal to 65535. The application code of all sectors in the IGA is equal to 0.

The number of sectors in all program areas of a disk is equal. Unused tracks in the program area or areas of a disk are encoded as empty tracks. The innermost (first) sector of the program area of layer L0 is equal to 0 (that is, $000000). The outermost (last) sector address of the program area of layer L1 is equal to $7FFFFF. The relation referred to above, namely ($7FFFFF=$00000 XOR $7FFFFF) exists between these both.

FIG. 9 shows an example of a dual layer disk with three tracks in the program area of layer L0 and two tracks in the program area of layer L1. For example, tracks 0, 1, 2 and 3 contain user data, and track 4 is an empty track. The track number of the first track of layer L1 is equal to the highest track number of layer L0 incremented by one.

The first sector address of the OGA (outer guard area) of layer L0 is equal to the last sector address in the program area incremented by one. The track number of all sectors in the OGA is equal to 65534. The application code of all sectors in the OGA is equal to 0. In single-layered disks, the layout of layer L0 can be used.

Figure 10:
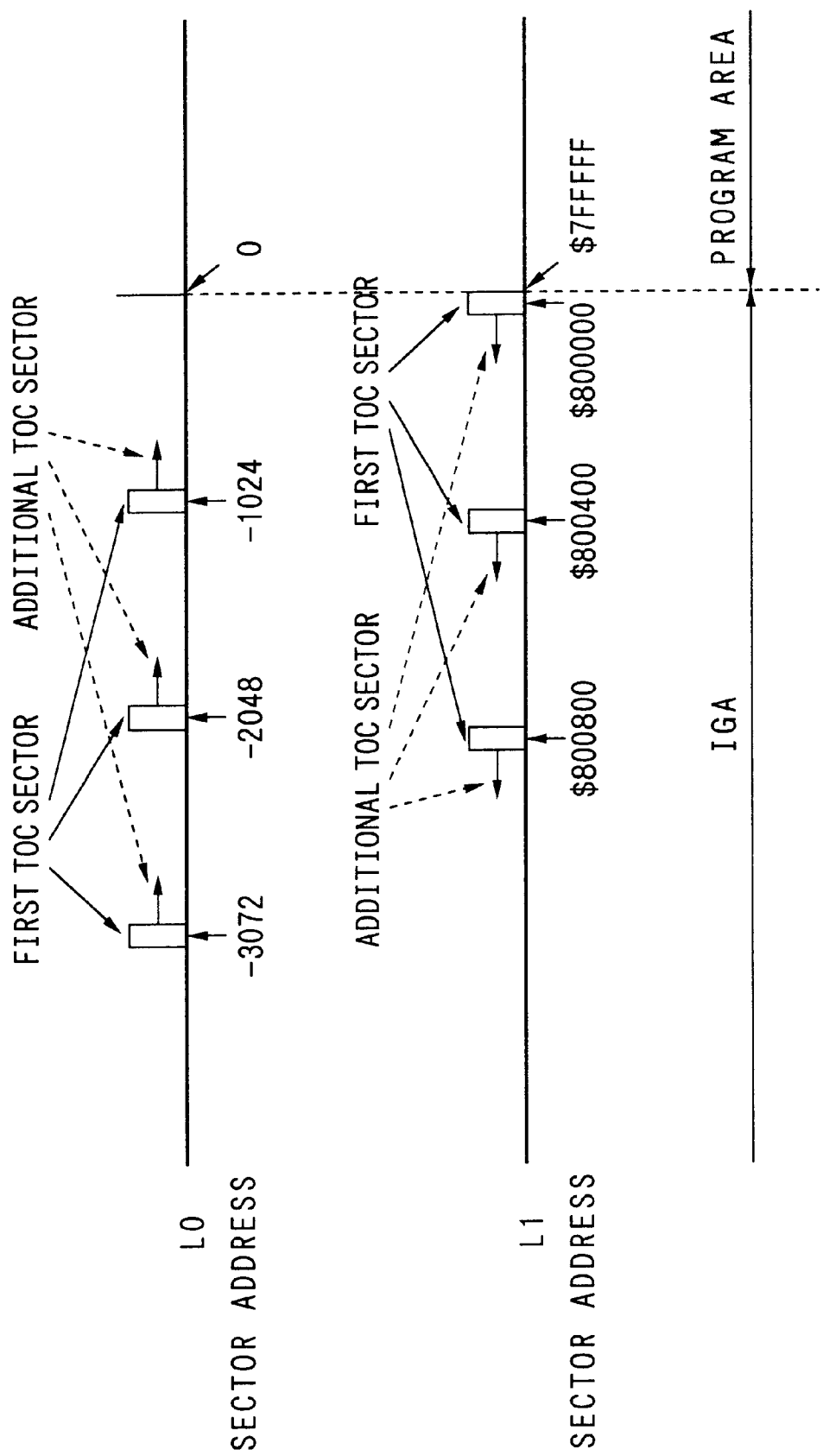
FIG. 10 is a schematic view for explaining another example of locations of TOC.

FIG. 10 shows the location of the TOC on a dual layer disk. Each layer contain three copies of the TOC. The TOC of each layer is located in the IGA, and includes a first TOC and an additional TOC. The TOC is recorded as one or more consecutive sectors. In layer L0, the first sector addresses of the TOC are: −3072, −2048 and −1024. In layer L1, the first sector addresses of the TOC are: (−1 XOR $7FFFFF), (−1025 XOR $7FFFFF) and (−2049 XOR $7FFFFF). For a single-layered disk, the location of the TOC of layer L0 is applicable.

The layout of the first TOC sector is given in FIG. 11. Individual fields are explained below. The "System ID" contains "HDCD" coded according to ISO 646.

The "System Version Number" is the version number of the high density CD system description used for the disk. The first two bytes contain the major version number encoded according to ISO 646, and the last two bytes contain the minor version number encoded according to ISO 646. For example, the major version number is "01", and the minor version number is "00".

The "Number of TOC Sectors" is a two-byte field containing the encoded number of sectors in the TOC. The "TOC Sector Number" is an encoded number indicating the sequence of the sector in the entire TOC. "0" is always recorded for the first TOC sector. The "Disc Entry" contains some parameters which indicate properties of the disk. The layout of the disc entry field is given in FIG. 12.

The "Disk Size", for example, of the disc entry is a one-byte field containing the encoded outer diameter of the disk in mm. All bytes in the reserved field have the value $00. The "Number of Layers" is a one-byte field containing the encoded number of data recording layers on the disk. The "Number of Tracks" is a two-byte field containing the encoded number of total tracks on the disk.

The "Logical Track Number Offset" is used as an offset value upon converting the physical track number to the logical track number. Although the physical track number is reset to "0" at the leading head of each disk, a single track number space can be made over a plurality of disks by using the "Logical Track Number Offset".

The "Disc Application ID" contains the application code of the disk. If the disk contains one application code and zero or more empty tracks, then the disk application ID is equal to the track application code, or else the application ID is equal to $FF.

The "Volume ID" is a 16-byte ISO 646 code and contains the identification of the disk. A group of disks with an identical volume ID is called a volume set. The number of disks in a volume set is encoded into two bytes of the volume set size.

The address number of a sector containing the disk information is encoded into a 24 bit "Disk Information Sector". The disk information sector is a 2-complement code. If the disk information is not available for a disk, then the value of the disk information sector is set to −1. The byte offset within the user data field of the disk is encoded as the two-byte "Disk Information Offset". If the disk information is not available for a disk, then the value of the disk information offset is set to $FFFF.

In FIG. 11, the "Layer 0 Entry" contains information on the uppermost layer (L0), and the "Layer 1 Entry" contains information on L1. Their contents are absolutely the same.

The layout of the "Layer Entry" is given in FIG. 13. The 16 bytes of the layer entry contain parameters of the layer in which the TOC is located. The Layer Number is a one-byte field indicating the number of the layer. The "First Address" gives the sector address of the first sector in the program area of the layer. The "First Address" is the lowest sector address value in the layer. The "Last Address" gives the sector address of the last sector in the program area of the layer. The "Last Address" is the highest sector address value in the layer.

The "First Track Number Offset" (two bytes) gives the value of the first track number in the program area of the layer. The "Number of Tracks" gives the number of tracks in the program area of the layer.

One byte of the "Layer Type" gives the type of the layer. The value 0 indicates the type I, the value 1 indicates the type II, and the value 2 indicates the type III. Values $1 to $FF mean Reserved. The Reserved field has the value $00.

Further explained are other fields of FIG. 11. The "Publisher Entry" is a 64-byte field containing information on the publisher of the disk. The "Manufacturer Entry" is a 32-byte field containing information on the manufacturer of the disk. The Reserved field has the value $00.

The "Track Entry" contains data on one track on the disk. Track Entry 0 contains data on the first track on the disk. All bytes in an unused Track Entry are set to $00. The layout of the Track Entry N is given in FIG. 14.

24 bits of the "Track Start Address" (2-complement code) give the sector address of the first sector in the track. The first sector in one track is the sector with the lowest Sector Address in the track. 24 bits of the "Track End Address" (2-complement code) give the sector address of the last sector in the track. The last sector in one track is the sector with the highest Sector Address in the track.

The "Track Copyright Code" is a one-byte field. If the Copyright Codes for all sectors in the track are equal, then the Track Copyright Code is equal to the Copyright Code of the sectors in the track, or else the Track Copyright Code is equal to 255.

The "Track Application Code" is a one-byte field. If the track is a single application track, then the Track Application Code is equal to the Application Code which is not empty. If the track is a mixed application track with sectors having a plurality of Application Codes, then the Track Application Code is equal to 255. If the Track Entry describes an empty track, then the Track Application Code is equal to 254.

The "Track Information Sector" is a 24-bit 2-complement code, and indicates the address of the sector that contains the Track Information. If the Track Information is not available for the track, then the value is set to −1.

The layout of the Additional TOC Sectors is given in FIG. 15. The value of Byte Position in FIG. 15 gives the start position of a field in the user data field of a sector. Byte Position 0 is the first byte in the user data field of a sector. Individual fields in the layout of the Addition TOC Sector have the same definition as that of the individual fields in the layout of the First TOC Sector shown in FIG. 11, and their explanation is omitted here.

Next explained is an apparatus for record and playback of multi-layered disks according to the invention. Kinds of data are immaterial for multi-layered disks according to the invention. However, only for explanation, FIG. 16 shows an apparatus for decoding (encoded) variable-rate data, as an apparatus used for recording and reproducing digital data of moving pictures having a large amount of data according to the MPEG (Moving Pictures Expert Group) standard, for example.

Figure 16:
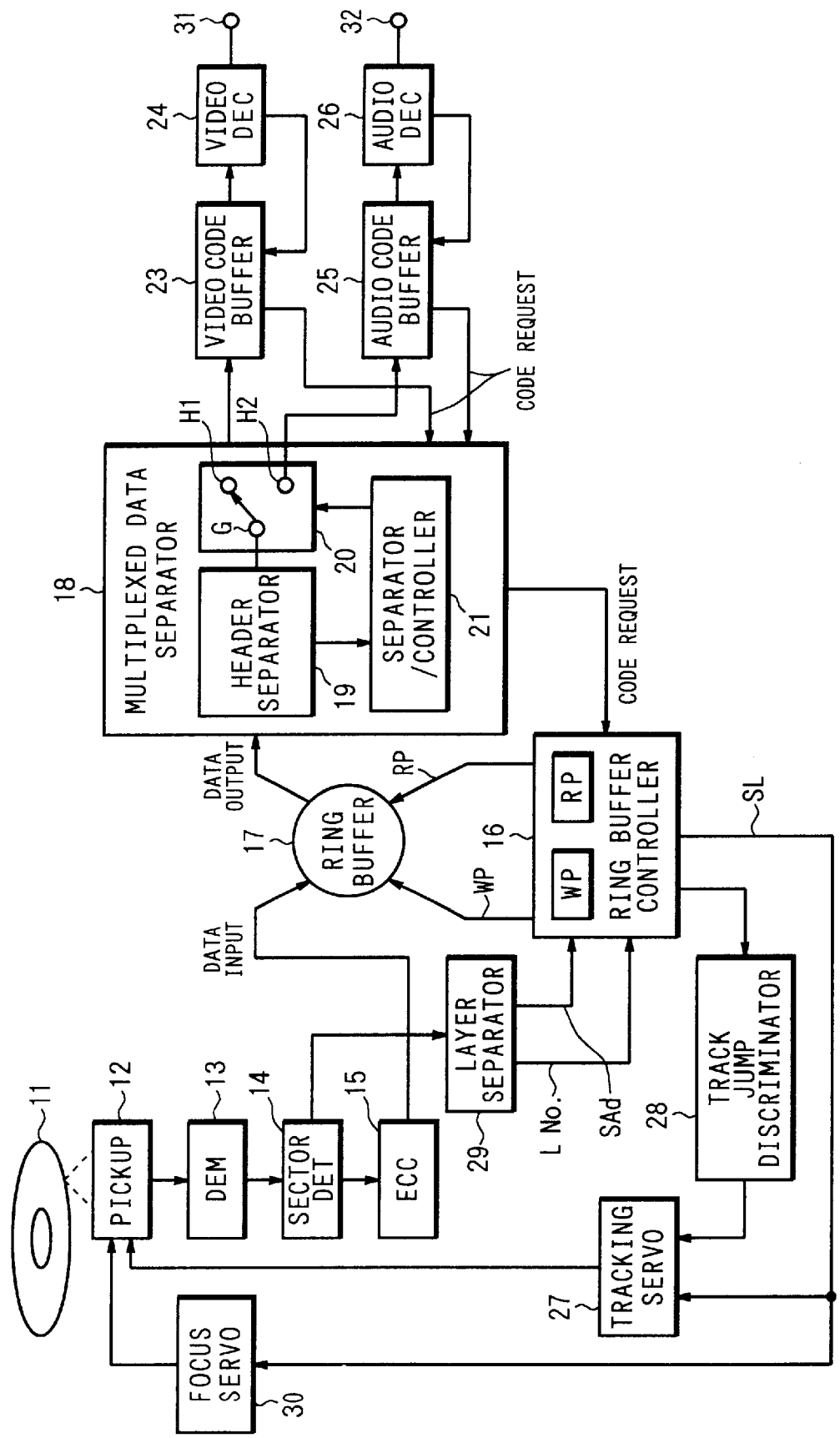
FIG. 16 is a block diagram of a disk playback apparatus according to an embodiment of the invention.

In FIG. 16, data on the optical disk 11 is reproduced by a pickup 12. the pickup 12 irradiates laser light onto the optical disk 11, and reproduces the data on the optical disk 11 from the reflected light. The signal reproduced by the pickup 12 is sent to a demodulator 13 which in turn demodulates the reproduced signal from the pickup 12 and transfers it to a sector detector 14.

The sector detector 14 detects sector data recorded on each sector from the data supplied, and supplies it to a layer separator 29. The layer separator 29 separates the sector address and the layer number from the sector data. The sector address SAd is supplied to a ring buffer controller 16, and the sector detector 14 outputs data to the next ECC circuit 15, keeping the sector synchronization. If the address is not detected or when the detected address is not contiguous, for example, then the sector detector 14 transfers a sector number error signal through the ring buffer controller 16 to a track jump discriminator 28. If the layer separator 29 cannot detect discontinuity of the layer number, or if the detected layer number is not equal, then the layer separator 29 supplies a layer number error signal through the ring buffer controller 16 to the track jump discriminator 28.

An Ecc circuit 15 detects an error in data supplied from the sector detector circuit 14, then corrects the error using redundant bits added to the data, and transfers the corrected data to ring buffer memory (FIFO) 17 for track jump. When the ECC circuit 15 cannot correct the error in the data, it supplies an error occurrence signal to a track jump discriminator 28.

The ring buffer controller 16 controls writing and reading of the ring buffer memory 17 and monitors a code request signal output from a multiplex data separator 18 to request data.

The track jump discriminator 28 monitors the output of the ring buffer controller 16. When a track jump is required, the ring buffer controller 16 outputs a track jump signal to a track jump servo circuit 17 to have the pickup 12 jump from a track to another on the optical disk under reproduction 11. The track jump discriminator 28 detects a sector number error signal from the sector detector 14, layer number error signal from the layer separator 29 and the error occurrence signal from the ECC circuit 15, and outputs a track jump signal to a tracking servo circuit 27 to have the pickup 12 jump from a track to another on the optical disk 11 under reproduction.

Data output from the ring buffer memory 17 is applied to the multiplex data separator 18. The header separator 19 of the multiplex data separator 18 separates the pack header and the packet header from the data supplied from the ring buffer memory 17, supplies them to a separator control circuit 21, and at the same time supplies time-divisional multiplex data to the input terminal G of a switching circuit 20. Output terminals (selective terminals) H1, H2 of the switching circuit 20 are coupled to input terminals of a video code buffer 23 and an audio code buffer 25. An output of the video code buffer 23 is coupled to the input of the video decoder 24, and an output of the audio code buffer 25 to input of an audio decoder 26.

A code request signal from the video decoder 24 is supplied to the video code buffer , and a code request signal from the video code buffer 23 is supplied to the multiplex data separator 18. The video data decoded by the video decoder 24 complies with the MPEG standard referred to above, in which three different pictures by three different coding methods, namely, intra-frame coded picture (normally called I picture), inter-frame predictive coded picture (normally called P picture) and inter-frame bi-directional predictive coded picture (normally called B picture), make a predetermined group (called GOP).

Similarly, a code request signal from the audio decoder 26 is supplied to the audio coder buffer 25, and a code request signal from the audio code buffer 25 is supplied to the multiplex data separator 18. The audio data decoded by the audio decoder 26 may comply with the MPEG standard here again, or may be either compressed coded digital audio data or non-compressed audio data by ATRAC (trademark) proposed by the present Applicant.

Next explained are behaviors of respective elements of the data decoding apparatus. The pickup 12 irradiates laser light onto the optical disk 11, and reproduces data recorded on the optical disk 11 from the reflected light. The reproduction signal from the pickup 12 is supplied to and demodulated in the demodulator 13. Data demodulated by the demodulator 13 is supplied to the ECC circuit 15 via the sector detector 14 for detection and correction of errors. If the sector number (address assigned to each sector of the optical disk 11) is not properly detected, then a sector number error signal is output to the track jump discriminator 28. When uncorrectable data is found, the ECC circuit 15 outputs the error occurrence signal to the track jump discriminator 28. The corrected data is supplied from the ECC circuit 15 to the ring buffer memory 17, and stored there.

Output (sector data) of the sector detector 14 is supplied to the layer separator 29, and separated into layer number LNo. and sector address SAd. Both the layer number and the sector address are supplied to the ring buffer controller 16. If the layer number (layer number recorded on a sector of the optical disk 11) is not detected normally in the layer separator 29, a layer number error signal is output to the track jump discriminator 28. The ring buffer controller 16 reads out the layer number LNo. and the sector address SAd, and designates a write address (write pointer (WP)) on the ring buffer memory 17 corresponding to the address Sad.

When the optical disk 11 is first reproduced by the data decoding apparatus, the information about the optical disk 11, whether it is single-layered or multi-layered and how many layers it has, is important for the servo circuit. Therefore, on the first reproduction of the optical disk 11, the number of recording layer on the disk is given from the layer separator 19 to a drive controller, not shown, and to the tracking servo circuit 27. Thus ensured is reliable reproduction.

Additionally, the ring buffer controller 16 designates a read address (read pointer (RP)) of data written in the ring buffer memory 17 on the basis of the code request signal from the next-stage multiplex data separator 18, then reads out data from the read pointer (RP), and supplies it to the multiplex data separator 18.

The header separator 19 of the multiplex data separator 18 separates the pack header and the packet header from the data supplied from the ring buffer memory 17, and supplies them to the separator controlling circuit 21. Pursuant to the stream id information of the packet header supplied from the header separator 19, the separator control circuit 21 sequentially connects the input terminal G with the output terminals (selective terminals) H1, H2 to properly separate the time-divisional multiplex data, and supplies it to a corresponding code buffer.

The video coder buffer 23 generates a code request to the multiplex data separator 18, depending on the amount of code buffer currently held inside, and stores received data. The video code buffer 23 accepts a code request from the video decoder 24, and supplies data held inside. The video decoder 24 reproduces the video signal from the supplied data, and outputs it through the output terminal 31.

Depending on the amount of the code buffer currently held inside, the audio code buffer 25 issues a code request to the multiplex data separator 18, and stores the received data. The audio code buffer 25 accepts a code request from the audio decoder 26 and supplies the data held inside. The audio decoder 26 reproduces the audio signal from the supplied data and outputs it through the output terminal 32.

Thus, the video decoder 24 requests data to the video code buffer 23, the video code buffer 23 in turn issues a request to the multiplex data separator 18, and the multiplex data separator 18 issues a request to the ring buffer controller 16. Responsively, data flows from the buffer memory 17 in the opposite direction relative to the direction of the requests.

When the amount of consumed data in the video decoder 24 in a unit time decreases due to, for example, data processing on simple pictures continued for a time, the amount of data read out from the ring buffer memory 17 also decreases. In this case, the amount of data stored in the ring buffer memory 17 increases. In order to prevent possible overflow, the track jump discriminator 28 calculates (detects) the amount of data currently stored in the ring buffer memory 17 by means of the write pointer (WP) and read pointer (RP). When the amount of data exceeds a predetermined reference value, the track jump discriminator 28 determines a possibility of overflow in the ring buffer memory 17, and outputs a track jump command to the tracking servo circuit 27.

When the track jump discriminator detects a sector number error signal from the sector detector 14 or an error occurrence signal from the ECC circuit 15, it calculates the amount of data held in the ring buffer memory 17 in view of the write pointer (WP) and the read pointer (RP), and determines a necessary amount of data for reliable reading from the ring buffer memory 17 to the multiplex data separator 18 during one revolution of the disk 11 (during the one-round waiting time of the disk 11).

When the amount of the remaining data in the ring buffer memory 17, underflow does not occur in the ring buffer memory 17 even when data is read out from the ring buffer memory 17 at the maximum transfer rate. Therefore, track jump discriminator 28 determines that the error can be corrected by again reproducing the location of the error by the pickup 12, and outputs a track jump command to the tracking servo circuit 27.

When the track jump command is output from the track jump discriminator 28, the tracking servo circuit 27 makes the position for reproduction by the pickup 12 to jump to a one-track inner position. Then in the ring buffer controller 16, writing of a new data onto the ring buffer memory 17 is prohibited until the position for reproduction reaches the position before the jump after another revolution of the optical disk 11, that is, until the sector number obtained from the sector detector 14 coincides with the sector number just before the track jump, and data already stored in the ring buffer memory 17 is transferred to the multiplex data separator 18, if necessary.

After the track jump, even when the sector number obtained from the sector detector 14 coincides with the sector number just before the track jump, if the amount of data stored in the ring buffer memory 17 exceeds the predetermined reference value, that is, if there is the possibility of overflow in the ring buffer memory 17, then writing of data onto the ring buffer memory 17 is not resumed, and another track jump is done.

When reproduction of the first layer is finished, the sector address SAd reaches a predetermined address, for example, address (255). The ring buffer controller 16 which detected the predetermined address supplies a layer switching signal to the focus servo circuit 30 and the tracking servo circuit 27. The focus servo circuit 30 changes over the focalization of the pickup 12 from the first layer to the second layer. The tracking servo circuit 27 interrupts the tracking servo control for a time until the changeover of the focalization to the second layer is accomplished. The reason why the tracking servo control is once interrupted is that no tracking error signal is obtained during dislocation of the focus from the first layer to the second layer.

When the tracking is completed, the sector detector 14 outputs a sector data of the second layer, and the layer number Ln n=1) and the sector address SAd (=256) are obtained by the layer separator 19. If the recorded data is video data according to the MPEG standard, the first picture of the second layer is preferably a so-called Intra (I picture) to minimize the decoding time.

It takes a certain period of time for the focus of the pickup 12 to move from a layer to another. However, the ring buffer memory 17 can store an amount of data corresponding to the time, and continuous reproduction of moving pictures is ensured.

If the amount of stored data is insufficient, the problem can be solved as explained below. For example, the same data may be written in both the outermost track of the first layer and the outermost track of the second layer such that the moving direction of the pickup can be inverted in a middle point of the track.

As another method for solving the problem, immediately before the end of the first layer, that is, when the sector address reaches near around 253 and 254, for example, all data after that may be written in the ring buffer memory 17 to the extent not causing overflow of the ring buffer memory 17. The ring buffer memory 17 ordinarily has surplus room for data storage so as to prevent under flow and overflow. Therefore, a flag for inversion may be contained in a predetermined sector number, if the number of sectors is fixed, or on the sub-code of the sectors if the number of sectors is variable.

Although the arrangement of FIG. 16 is for a disk playback apparatus, a disk recording apparatus can be made by using a recordable disk such as magneto-optic disk, phase-change-type disk, and so forth, as the optical disk 11. In this case, sector synchronizing signals, sector addresses, and other like information are pre-formatted, and data is recorded in predetermined locations using the pre-formatted information.

Although a particular example has been described as the uppermost recording layer has the recording direction from the inner side to the outer side, the recording direction may be opposite. Further, although the example uses spiral tracks, the invention is also applicable to a different example using concentric tracks.

As explained above, since the data recording medium according to the invention is configured to alternately change the recording direction among a plurality recording layers, it facilitates translation from a layer to another at a high speed and enables quick access. In addition, with the record/playback apparatus for such data recording medium, the changeover from a layer to another during recording or playback is smooth, and high-speed access is possible.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A disk-shaped data recording medium on which an amount of data is to be recorded, comprising:

at least a first and a second recording layers;

a first recording direction from the inner side to the outer side of said medium and a second recording direction from the outer side to the inner side of said medium being determined as directions for recording data;

one of said first and second recording directions being used as the recording direction of said first recording layer;

the other of said first and second recording directions being used as the recording direction of said second recording layer;

each of said recording layers including a data area in which data has a sector structure, and each sector containing at least a layer number for identifying said first recording layer and said second recording layer; and wherein substantially one half of said amount of data to be recorded on said medium is recorded to a predetermined data area in said data area of said first recording layer, said predetermined data area being smaller than said data area available for recording the data, and the remainder of the data is recorded in said data area of said second recording layer such that a start position of the data in one of said first and second recording layers is substantially at the same radial position as a final position of the data in the other of said first and second recording layers.

2. The data recording medium of claim 1, wherein n recording layers are provided; and wherein each sector further includes information representing said n recording layers.

3. A recording apparatus comprising means for recording data on a disk-shaped data recording medium on which an amount of data is to be recorded, comprising:

at least a first and a second recording layers;

a first recording direction from the inner side to the outer side of said medium and a second recording direction from the outer side to the inner side of said medium being determined as directions for recording data;

one of said first and second recording directions being used as the recording direction of said first recording layer;

the other of said first and second recording directions being used as the recording direction of said second recording layer;

each of said recording layers including a data area in which data has a sector structure, and each sector containing a least a layer number for identifying said first recording layer and said second recording layer; and wherein substantially one half of said amount of data to be recorded on said medium is recorded to a predetermined data area in said data area of said first recording layer, said predetermined data area being smaller than said data area available for recording the data, and the remainder of the data is recorded in said data area of said second recording layer such that a start position of the data in one of said first and second recording layers is substantially at the same radial position as a final position of the data in the other of said first and second recording layers.

4. A playback apparatus comprising means for reproducing data from a disk-shaped data recording medium on which an amount of data was previously recorded, comprising:

at least a first and a second recording layers;

a first recording direction from the inner side to the outer side of said medium and a second recording direction from the outer side to the inner side of said medium being determined as directions for recording data;

one of said first and second recording directions being used as the recording direction of said first recording layer;

the other of said first and second recording directions being used as the recording direction of said second recording layer;

each of said recording layers including a data area in which data has a sector structure, and each sector containing at least a layer number for identifying said first recording layer and said second recording layer; and wherein substantially one half of said amount of data previously recorded on said medium is recorded to a predetermined data area in said data area or said first recording layer, said predetermined data area being smaller than said data area available for recording the data, and the remainder or the data is recorded in said data area of said second recording layer such that a start position of the data in one of said first and second recording layers is substantially at the same radial position as a final position of the data in the other of said first and second recording layers.

5. A record/playback apparatus comprising:

means for recording data on a disk-shaped data recording medium on which an amount of data is to be recorded; and means for reproducing data from said data recording medium, wherein said data recording medium comprising:

a least a first and a second recording layers;

a first recording direction from the inner side to the outer side or said medium and a second recording direction from the outer side to the inner side of said medium being determined as directions for recording data;

one of said first and second recording directions being used as the recording direction of said first recording layer;

the other of said first and second recording directions being used as the recording direction of said second recording layer;

each of said recording layers including a data area in which data has a sector structure, and each sector containing at least a layer number for identifying said first recording layer and said second recording layer; and wherein substantially one half of said amount of data to be recorded on said medium is recorded to a predetermined data area in said data area of said first recording layer, said predetermined data area being smaller than said data area available for recording the data, and the remainder of the data is recorded in said data area of said second recording layer such that a start position of the data in one of said first and second recording layers is substantially at the same radial position as a final position of the data in the other of said first and second recording layers.

6. The data recording medium of claim 1, further comprising a sector address recorded in each sector on said medium to uniquely identify each sector of said first recording layer and said second recording layer, wherein a predetermined portion of said sector address identifies said layer number.

7. The recording apparatus of claim 3, wherein n recording layers are provided on said recording medium; and wherein each sector further includes information representing n recording layers.

8. The recording apparatus of claim 3, further comprising a sector address recorded in each sector on said medium to uniquely identify each sector of said first recording layer and said second recording layer, wherein a predetermined portion of said sector address identifies said layer number.

9. The playback apparatus of claim 4, wherein n recording layers are provided on said recording medium; and wherein each sector further includes information representing n recording layers.

10. The playback apparatus of claim 4, further comprising a sector address recorded in each sector on said medium to uniquely identify each sector of said first recording layer and said second recording layer, wherein a predetermined portion of said sector address identifies said layer number.

11. The record/playback apparatus of claim 5, wherein n recording layers are provided on said recording medium; and wherein each sector further includes information representing n recording layers.

12. The record/playback apparatus of claim 5, further comprising a sector address recorded in each sector on said medium to uniquely identify each sector of said first recording layer and said second recording layer, wherein a predetermined portion of said sector address identifies said layer number.

* * * * *